US012785387B2

(12) United States Patent
Emanet et al.

(10) Patent No.: US 12,785,387 B2
(45) **Date of Patent: *Nov. 3, 2026**

(54) SOLAR POWER GENERATION SYSTEM

(71) Applicant: OMRON Corporation, Kyoto (JP)

(72) Inventors: Nahit Emanet, East Greenwich, RI (US); Oezguer Aksoy, East Greenwich, RI (US); Mustafa Mihmanli, East Greenwich, RI (US); Takahiro Takeyama, Kyoto (JP); Ryo Ogura, Kyoto (JP); Jeongho Baik, Kyoto (JP); Jun Nakaichi, Kyoto (JP); Tsuyoshi Uchida, Hoffman Estates, IL (US); Tomoko Endo, Hoffman Estates, IL (US); Erica Martin, Hoffman Estates, IL (US)

(73) Assignee: OMRON CORPORATION, Kyoto (JP)

(*) Notice: Subject to any disclaimer, the term of this patent is extended or adjusted under 35 U.S.C. 154(b) by 704 days.

This patent is subject to a terminal disclaimer.

(21) Appl. No.: 18/218,583

(22) Filed: Jul. 6, 2023

(65) Prior Publication Data

US 2024/0039277 A1 Feb. 1, 2024

(30) Foreign Application Priority Data

Jul. 29, 2022 (JP) ................................ 2022-121832

(51) Int. Cl.

*H02J 1/102* (2026.01)
*H02J 3/38* (2006.01)

(Continued)

(52) U.S. Cl.

CPC .............. *H02J 1/102* (2013.01); *H02J 3/381* (2013.01); *H02S 40/32* (2014.12); *H02S 40/36* (2014.12); *H02J 2101/24* (2026.01)

(58) Field of Classification Search

CPC ........ H02J 1/102; H02J 3/381; H02J 2101/24; H02J 1/10; H02S 40/32; H02S 40/36; H02S 40/30; H02S 40/34

See application file for complete search history.

(56) References Cited

U.S. PATENT DOCUMENTS

2022/0255500 A1* 8/2022 Ogura ..................... H02S 40/32
2024/0039467 A1* 2/2024 Takeyama .............. H02S 40/36

FOREIGN PATENT DOCUMENTS

JP 2012-511299 A 5/2012
JP 2021035218 A * 3/2021 ........... G08B 21/187

(Continued)

*Primary Examiner* — Seung H Lee

(74) *Attorney, Agent, or Firm* — SHINJYU GLOBAL IP

(57) ABSTRACT

A solar power generation system includes a string, an inverter, and a plurality of shut-off devices. The string includes a plurality of solar cell module groups. The plurality of shut-off devices are configured to cut off a connection between the plurality of solar cell module groups. The plurality of solar cell module groups include a first group, a second group connected to the first group, and a third group connected to the second group. The plurality of shut-off devices includes a first open-close unit connected to the second group, a semiconductor switching device connected in series to the first open-close unit, and a power supply unit connected to the second group and configured to generate power to drive the first open-close unit. The semiconductor switching device enters an OFF state when an amount of power generated by second group is smaller than a predetermined threshold.

16 Claims, 8 Drawing Sheets

(51) Int. Cl.

| | |
|---|---|
| ***H02S 40/32*** | (2014.01) |
| ***H02S 40/36*** | (2014.01) |
| *H02J 101/24* | (2026.01) |

(56) References Cited

FOREIGN PATENT DOCUMENTS

| | | | | | |
|---|---|---|---|---|---|
| WO | 2010/065043 | A1 | | 6/2010 | |
| WO | WO-2021024339 | A1 | * | 2/2021 | ............. H02S 40/30 |

* cited by examiner

| OPERATION MODE | | WEATHER/ SUNSHINE | POWER GENERATION | CONTROL SIGNAL | RELAY OPERATION MODE | SEMICONDUCTOR SWITCHING DEVICE OPERATION MODE |
|---|---|---|---|---|---|---|
| START | |  | YES | ON | ON | ON |
| ACTIVE | |  | YES | ON | ON | ON |
| SAFETY | NORMAL SHUT-OFF |  | NO | OFF | OFF | OFF |
| | |  | UNSTABLE | ON | ON or ON/OFF | OFF |
| | EMERGENCY SAFETY SHUT-OFF |  | YES | OFF | OFF | OFF |

SOLAR POWER GENERATION SYSTEM

CROSS-REFERENCE TO RELATED APPLICATION

This application claims priority to Japanese Patent Application No. 2022-121832, filed Jul. 29, 2022. The contents of that application are incorporated by reference in their entirety.

FIELD

The present invention relates to a solar power generation system.

BACKGROUND

In the United States, to protect firefighters from electric shock in an emergency such as a fire, the introduction into a solar power generation system of a so-called rapid shutdown function for immediately stopping the power generation by a solar power generation system in an emergency is mandated by National Electrical Code (NEC). For example, Published Japanese Translation No. 2012-511299 of the PCT International Publication discloses a solar power generation system in which the output of power from solar cell modules to an inverter is stopped according to the operating state of the inverter.

SUMMARY

In a solar power generation system, in order to further improve the safety of firefighters in the event of a fire, for example, a shut-off device having the rapid shutdown function is preferably installed for each solar cell module. However, providing a shut-off device for each solar cell module increases the installation cost of the shut-off devices.

Further, the shut-off device of a solar power generation system uses a switching device for opening and closing a mechanical contact such as a relay as a switching device for cutting off an electric circuit in the solar power generation system. The power for driving the switching device is supplied from the solar cell modules of the solar power generation system. That is, the power generated by the solar cell modules is used for driving an external device (for example, an inverter) and driving the switching device. In this case, if the amount of power generated by the solar cell modules drops for some reason and the power required to drive the switching device is no longer supplied to the switching device, a phenomenon in which if an attempt is made to close the contact of the switching device with the power from the solar cell modules (i.e., to turn the switching device into an ON state), the contact is opened immediately (i.e., the switching device is turned into an OFF state), and this sequence of closing and opening is repeated. Further, when the amount of power generated by the solar cell modules becomes unstable, the switching device may be repeatedly switched between the ON state and the OFF state. The occurrence of this phenomenon makes the operation of the solar power generation system unstable, thereby hindering the operation of the solar power generation system.

An object of the present invention is to provide a solar power generation system that decreases the installation cost of shut-off devices and improves stability of the solar power generation system.

A solar power generation system according to one aspect of the claimed invention includes a string, an inverter, and a plurality of shut-off devices. The string includes a plurality of solar cell module groups connected in series with each other. Each of the plurality of solar cell module groups includes one or more solar cell modules connected in series. The inverter is connected to the string for converting DC power output from the solar cell modules to AC power. The plurality shut-off devices are configured to cut off a connection between the plurality of solar cell module groups in response to a control signal from the inverter. Each of the plurality of solar cell module groups has an open-circuit voltage equal to or less than a predetermined open-circuit voltage. The plurality of solar cell module groups include a first group, a second group connected to the first group, and a third group connected to the second group. The plurality of solar cell modules include a first shut-off device. The first shut-off device includes a first open-close unit, a first semiconductor switching device, and first power supply unit. The first open-close unit is connected to an anode-side terminal of the second group. The first semiconductor switching device is connected in series between the anode-side terminal of the second group and the first open-close unit. The first power supply unit is configured to generate power to drive the first open-close unit. The first power supply unit has an anode-side terminal connected between the anode-side terminal of the second group and the first semiconductor switching device, and a cathode-side terminal connected to a cathode-side terminal of the second group. The first semiconductor switching device is configured to enter an OFF state in a case where an amount of power generated by the second group is smaller than a predetermined threshold.

In this solar power generation system, since each of the plurality of solar cell module groups has an open-circuit voltage equal to or less than a predetermined open-circuit voltage, a highly safe solar power generation system can be provided. Further, the first semiconductor switching device is turned into an OFF state when the amount of power generated by the second group is smaller than a predetermined threshold. Thus, when the amount of power generated by the second group is small, an electric path from the second group to the inverter is cut off, and the second group can supply power only to the first power supply unit. That is, when the amount of power generated by the second group is small, the power generated by the second group is used only to drive the first open-close unit. As a result, the first open-close unit can be maintained in the closed state (ON state) even if the amount of power generated by the second group is small or unstable. As a result, the solar power generation system operates stably.

The first shut-off device may include a first bypass device. The first bypass device may include one end connected to the cathode-side terminal of the second group, and another end connected between the first open-close unit and the first semiconductor switching device. In this case, even if the amount of power generated by the second group decreases, the power generated by another solar cell module group can be transferred to the inverter via the first bypass device.

The first semiconductor switching device may be a MOSFET device or an IGBT device. These devices can reduce the power required to turn the semiconductor switching device into an ON state or an OFF state.

The first shut-off device may include a second open-close unit connected to the cathode-side terminal of the second group. In this case, a plurality of electric circuits can be opened and closed by the first shut-off device.

The second open-close unit may be driven by the power supplied from the first power supply unit. In this case, the second open-close unit can be maintained in the closed state (ON state) even if the amount of power generated by the second group is small or unstable.

The second open-close unit may be driven by the power supplied from the first power supply unit. In this case, for example, when a defect such as a contact failure occurs in the third open-close unit, it is possible to continue to use the fourth open-close unit that is operating normally.

At least one of the first group, the second group, and the third group of the plurality of solar cell module groups may include the plurality of solar cell modules connected in series. In this case, the plurality of solar cell modules can be collectively cut off by the first shut-off device.

The plurality of solar cell module groups may further include a fourth group connected to the third group and a fifth group connected to the fourth group. The plurality shut-off device may include a second shut-off device, a third open-close unit, a second semiconductor switching device, and a second power supply unit. The third open-close unit may be connected to an anode-side terminal of the fourth group. The second semiconductor switching device may be connected in series between the anode-side terminal of the fourth group and the third open-close unit. The second power supply unit may be configured to generate power to drive the third open-close unit. The second power supply unit may have an anode-side terminal connected between the anode-side terminal of the fourth group and the second semiconductor switching device, and a cathode-side terminal connected to a cathode-side terminal of the fourth group. The second semiconductor switching device may be configured to enter an OFF state in a case where an amount of power generated by the fourth group is smaller than a predetermined threshold. In this case, when the amount of power generated by the fourth group is small, the power generated by the fourth group is used only to drive the third open-close unit. As long as the power generated by the fourth group is supplied only to drive the third open-close unit, the third open-close unit can be maintained in the closed state (ON state) even if the power generated by the fourth group is small or unstable.

The second shut-off device may include a second bypass device. The second bypass device may include one end connected to the cathode-side terminal of the fourth group, and another end connected between the third open-close unit and the second semiconductor switching device. In this case, even if the amount of power generated by the fourth group decreases, the power generated by another solar cell module group can be transferred to the inverter via the second bypass device.

The second semiconductor switching device may be a MOSFET device or an IGBT device. These devices can reduce the power required to turn the second semiconductor switching device into an ON state or an OFF state.

The second shut-off device may include a fourth open-close unit connected to the cathode-side terminal of the fourth group. In this case, a plurality of electric circuits can be opened and closed by the second shut-off device.

The fourth open-close unit may be driven by the power supplied from the second power supply unit. In this case, the fourth open-close unit can be maintained in the closed state (ON state) even if the amount of power generated by the fourth group is small or unstable.

The second shut-off device may be configured to control the opening and closing of the third open-close unit and the fourth open-close unit independently of each other. In this case, for example, when a defect such as a contact failure occurs in the third open-close unit, it is possible to continue to use the fourth open-close unit that is operating normally.

The predetermined open-circuit voltage may be 165 V. In this case, a safer solar power generation system can be provided.

The inverter may output the control signal to the plurality of shut-off devices by power line communication. In this case, when the plurality of shut-off devices are disposed in an existing solar power generation system, additional wiring for ensuring the communication between the inverter and the plurality of shut-off device can be omitted, which reduces the installation cost of the plurality of shut-off device.

The inverter may output the control signal to the plurality of shut-off devices by wireless communication. In this case, the control signal can be output to the plurality of shut-off devices by remote control.

DETAILED DESCRIPTION

Figure 1:
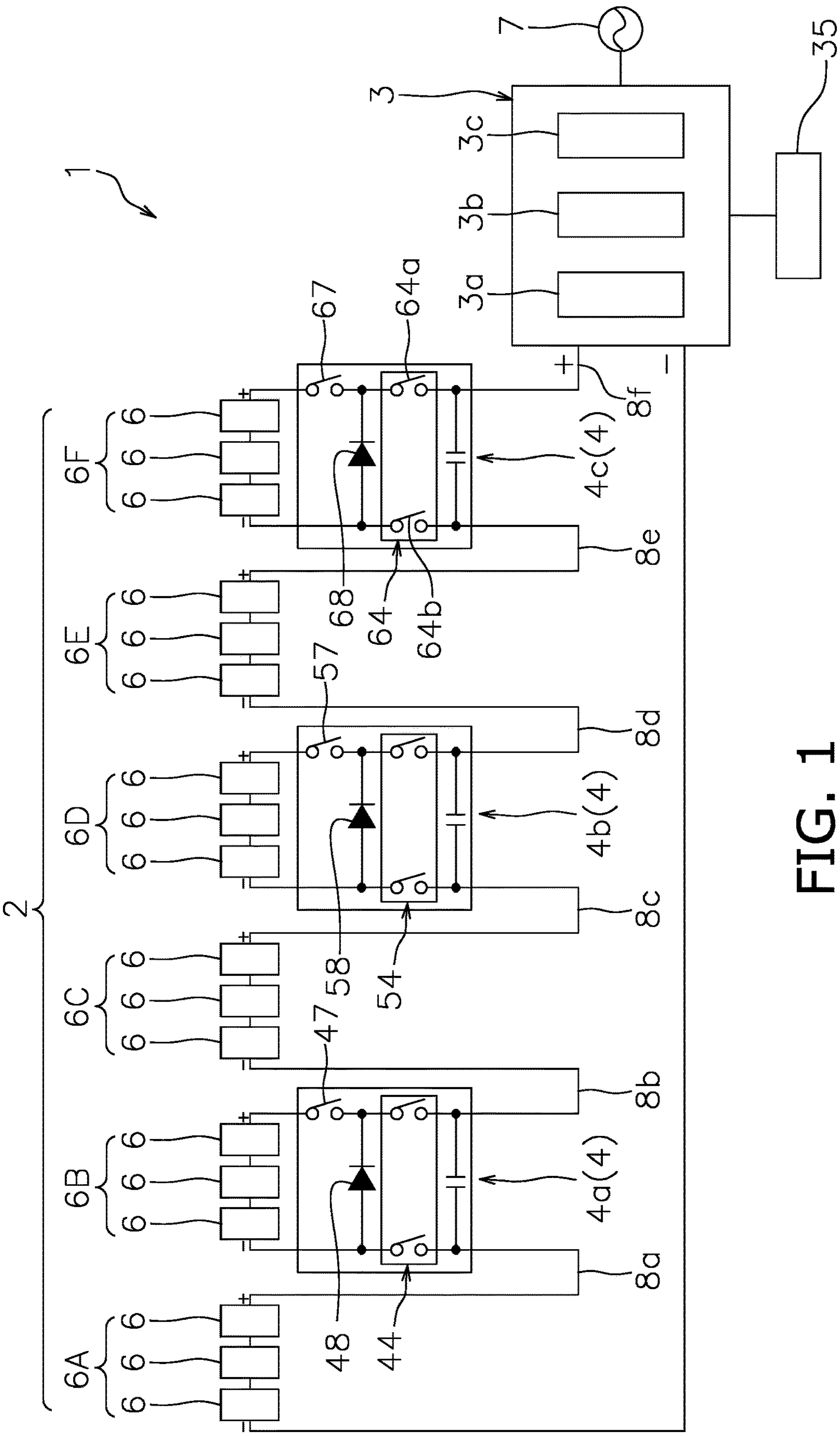
FIG. 1 is a block diagram schematically showing a configuration of a solar power generation system according to an aspect of the present invention.

FIG. 1 is a block diagram schematically showing a configuration of a solar power generation system 1 in accordance with the claimed invention. The solar power generation system 1 includes a string 2, an inverter 3, and a plurality of shut-off devices 4.

The string 2 includes a plurality of solar cell module groups connected in series with each other. Each of the plurality of solar cell module groups includes one or more solar cell modules 6 connected in series. That is, the string 2 includes a plurality of (for example, 18 in the present embodiment) solar cell modules 6 connected in series with each other. The plurality of solar cell module groups in the present embodiment are composed of six solar cell module groups 6A to 6F. Note that the solar power generation system 1 may include a solar cell array in which a plurality of strings 2 are connected in parallel.

Each of the plurality of solar cell module groups 6A to 6F has an open-circuit voltage equal to or less than a predetermined open-circuit voltage. The predetermined open-circuit voltage may, for example, be 165V. That is, modules in the solar cell module groups in the string 2 are grouped so that the open-circuit voltage for each group is 165 V or less. The open-circuit voltage of each of the solar cell modules 6 is, for example, 50V. Hereinafter, the solar cell module groups 6A to 6F may be referred to as groups 6A to 6F. The groups 6A to 6F in this embodiment are examples of the first group to the sixth group.

Each of the groups 6A to 6F includes three solar cell modules 6 connected in series with each other. Therefore, the open-circuit voltage of each of the groups 6A to 6F is 150V.

The groups 6A to 6F are arranged in alphabetical order from the group 6A to the group 6F and are connected in series with each other. Each of the groups 6A to 6F includes an anode-side terminal and a cathode-side terminal. The anode-side terminal in each of the groups 6A to 6F corresponds to the anode-side terminal of the solar cell modules 6 closest to the anode of the inverter 3 among the plurality of solar cell modules 6 in the groups 6A to 6F. The cathode-side terminal in each of the groups 6A to 6F corresponds to the cathode-side terminal of the solar cell modules 6 farthest from the anode of the inverter 3 among the plurality of solar cell modules 6 in the groups 6A to 6F.

The anode-side terminal of the group 6A corresponds to the anode-side terminal of the solar cell module closest to the group 6B among the solar cell modules 6 in the group 6A and is connected to the cathode-side terminal of the group 6B. The cathode-side terminal of the group 6A corresponds to the cathode-side terminal of the solar cell module farther from the group 6B among the solar cell modules 6 in the group 6A and is connected to the cathode-side terminal of the inverter 3.

The anode-side terminal of the group 6B corresponds to the anode-side terminal of the solar cell module closest to the group 6C among the solar cell modules 6 in the group 6B and is connected to the cathode-side terminal of the group 6C. The cathode-side terminal of the group 6B corresponds to the cathode-side terminal of the solar cell module closest to the group 6A among the solar cell modules 6 in the group 6B and is connected to the anode-side terminal of the group 6A.

The anode-side terminal of the group 6C is connected to the cathode-side terminal of the group 6D. The cathode-side terminal of the group 6C is connected to the anode-side terminal of the group 6B. The anode-side terminal of the group 6D is connected to the cathode-side terminal of the group 6E. The cathode-side terminal of the group 6D is connected to the anode-side terminal of the group 6C. The anode-side terminal of the group 6E is connected to the cathode-side terminal of the group 6F. The cathode-side terminal of the group 6E is connected to the anode-side terminal of the group 6D. The anode-side terminal of the group 6F is connected to the cathode-side terminal of the inverter 3. The cathode-side terminal of the group 6F is connected to the anode-side terminal of the group 6E.

The solar cell modules 6 receive sunlight to generate power, and they output the generated power to the inverter 3. The inverter 3 is connected to the string 2 via a power line. The inverter 3 converts the DC power from the solar cell modules 6 in the string 2 into AC power. The inverter 3 is connected to a power system 7 and supplies the AC power to the commercial power system and load devices.

Specifically, the inverter 3 includes a DC/DC converter 3*a*, a DC/AC inverter 3*b*, and a control unit 3*c*. The DC/DC converter 3*a* converts the voltage of the power output from the solar cell modules 6 into a predetermined voltage and inputs it to the DC/AC inverter 3*b*. The DC/AC inverter 3*b* converts, via the DC/DC converter 3*a*, the DC power output from the solar cell modules 6 into AC power. The control unit 3*c* includes a CPU and memory and controls the DC/DC converter 3*a* and the DC/AC inverter 3*b*. The control unit 3*c* outputs a control signal to the plurality of shut-off devices 4 by power line communication.

The plurality of shut-off devices 4 are connected to electric paths connecting the groups 6A to 6F. The plurality of shut-off devices 4 cut off the connection between the groups 6A to 6F in response to the control signal from the inverter 3. The plurality of shut-off devices 4 include shut-off devices 4*a* to 4*c*. The shut-off device 4*a* in the present embodiment is an example of the first shut-off device, and the shut-off device 4*b* is an example of the second shut-off device.

The shut-off device 4*a* is connected to an electric path 8*a* connecting the group 6A and the group 6B and an electric path 8*b* connecting the group 6B and the group 6C. The shut-off device 4*a* cuts off the connection between the group 6A and the group 6B and the connection between the group 6B and the group 6C in response to the control signal from the inverter 3. Specifically, the shut-off device 4*a* cuts off the electric paths 8*a* and 8*b* by cutting off the voltage output from the solar cell modules 6 of the group 6B in response to the control signal from the inverter 3. As a result, the connection between the group 6A and the group 6B and the connection between the group 6B and the group 6C are cut off.

The shut-off device 4*a* is driven by the electric power generated by the solar cell modules 6 of the group 6B. The shut-off device 4*a* is externally attached, for example, to the solar cell modules 6 of the group 6B.

Figure 2:
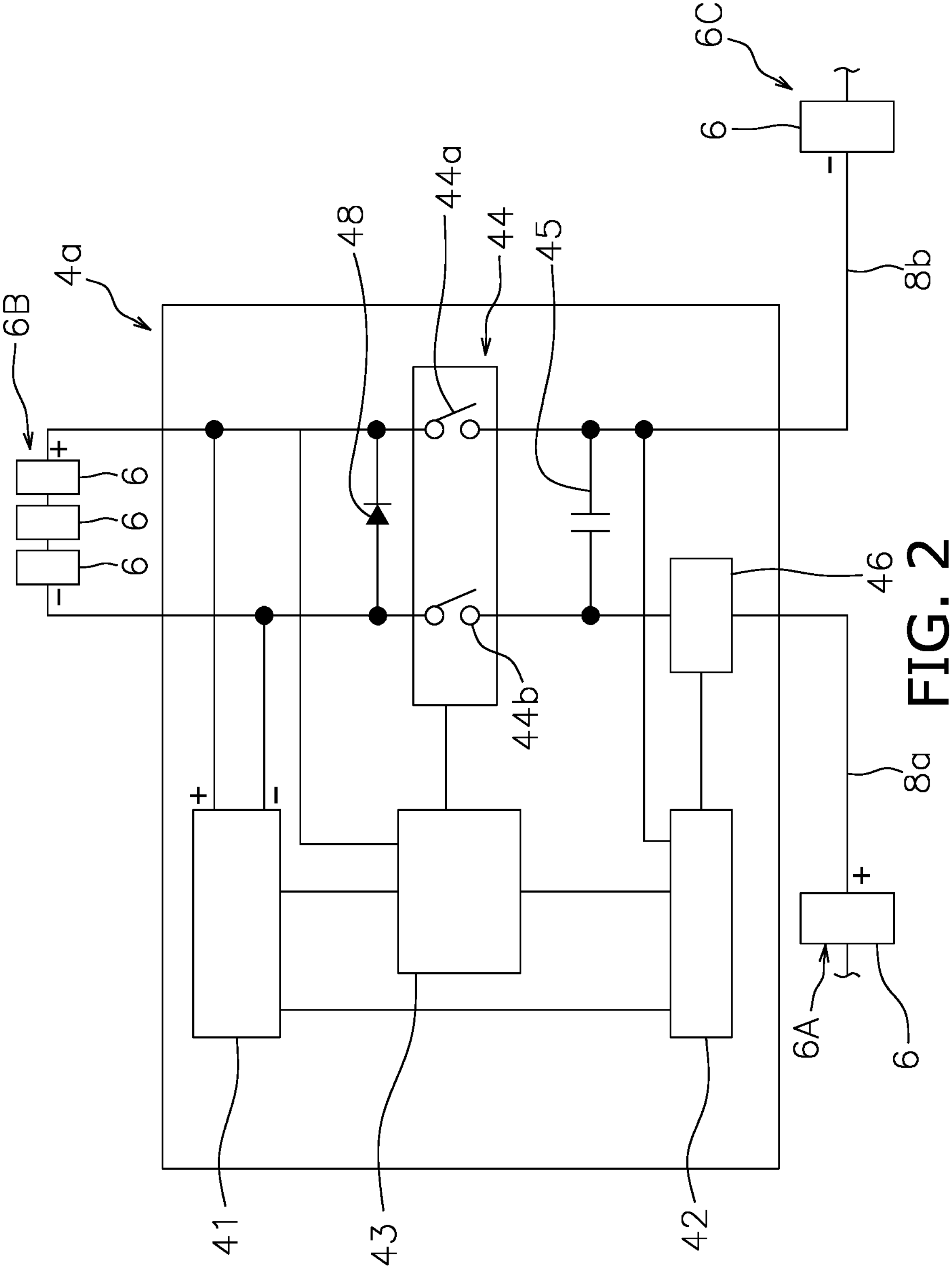
FIG. 2 is a block diagram schematically showing a configuration of a shut-off device.

FIG. 2 is a block diagram schematically showing a configuration of the shut-off device 4*a*. The shut-off device 4*a* includes a power supply unit 41, a signal-receiving unit 42, a control unit 43, a relay 44, a bypass circuit 45, a semiconductor switching device 47, and a bypass device 48.

The power supply unit 41 is a regulator connected in parallel to the group 6B. Specifically, the power supply unit 41 has an anode-side terminal connected to the anode-side terminal of the group 6B and a cathode-side terminal connected to the cathode-side terminal of the group 6B.

Figure 3:
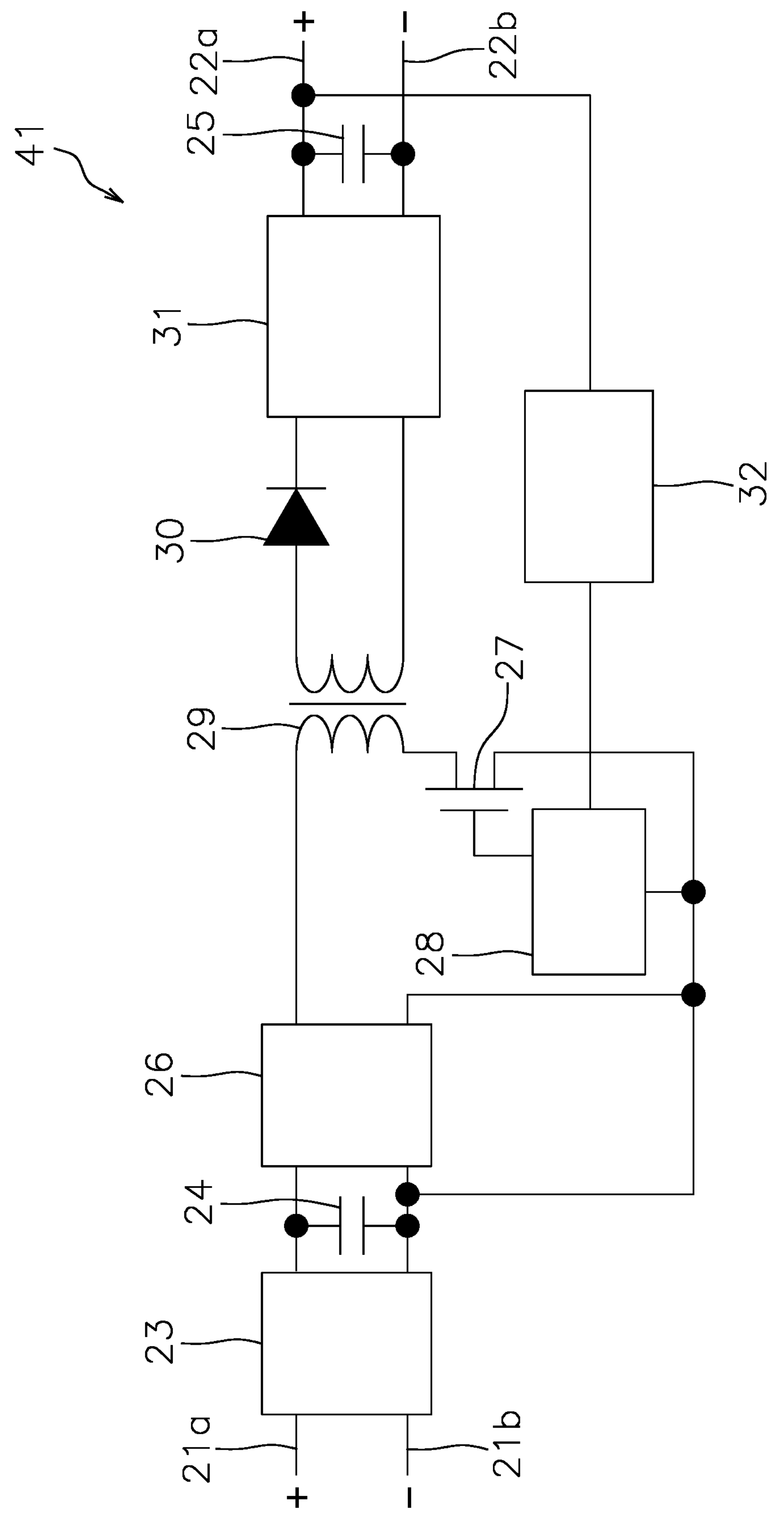
FIG. 3 is a circuit diagram schematically showing a configuration of a regulator.

FIG. 3 is a circuit diagram schematically showing a configuration of the power supply unit 41. The power supply unit 41 includes input terminals 21*a* and 21*b*, output terminals 22*a* and 22*b*, a line filter 23, capacitors 24 and 25, a booster circuit 26, a switching device 27, a control circuit 28, a transformer 29, a diode 30, and a DC/DC converter 31, and a feedback circuit 32.

The power supply unit 41 uses the power generated by the solar cell modules 6 as a power source to generate drive power to drive the shut-off device 4*s*. Here, only the power generated by the solar cell modules 6 of the group 6B is used to generate the drive power to drive the shut-off device 4*a*.

The signal-receiving unit 42 receives the control signal from the control unit 3*c* of the inverter 3 and outputs the received control signal to the control unit 43. Specifically, the signal-receiving unit 42 receives the control signal from the control unit 3*c* of the inverter 3 via a signal detection unit 46 that detects the control signal from the control unit 3*c* of the inverter 3.

The control unit 43 includes a CPU and memory. The control unit 43 controls the electric current flowing through the coil in the relay 44 based on the signals output from the signal-receiving unit 42 and controls the opening and closing of the contacts of the relay 44. The relay 44 is, for example, a mechanical relay, and is able to open and close a high-voltage direct current.

The relay 44 includes a first open-close unit 44*a* and a second open-close unit 44*b*. The first open-close unit 44*a* is connected to the anode-side terminal of the group 6B. The first open-close unit 44*a* is disposed in the electric path 8*b* and opens and closes the connection between the group 6B and the group 6C. The second open-close unit 44*b* is connected to the cathode-side terminal of the group 6B. The second open-close unit 44*b* is disposed in the electric path 8*a* and opens and closes the connection between the group 6A and the group 6B. Hereinafter, the first open-close unit 44*a* and the second open-close unit 44*b* may be referred to as open-close units 44*a* and 44*b*.

While the drive power is not supplied from the power supply unit 41, the open-close units 44*a* and 44*b* are in an open state all the time. Accordingly, while the shut-off device 4*a* is not driven, the connection between the group 6A and the group 6B and the connection between the group 6B and the group 6C are in a cutoff state.

The bypass circuit 45 is a circuit for the signal-receiving unit 42 to receive the control signal from the control unit 3*c* in a state where the connection between the groups 6A to 6F is cut off. In a state where the connection between the group 6A and the group 6B and the connection between the group 6B and the group 6C are cut off, the signal-receiving unit 42 is able to receive the control signal from the control unit 3*c* via the bypass circuit 45.

The semiconductor switching device 47 is connected in series with the first open-close unit 44*a* in the electric path 8*b*. Specifically, the semiconductor switching device 47 is connected at one end to the anode-side terminal of group 6A. The other end of the semiconductor switching device 47 is connected to the first open-close unit 44*a*. The semiconductor switching device 47 is, for example, a MOSFET device or an Insulated Gate Bipolar Transistor (IGBT) device.

The semiconductor switching device 47 is connected to the control unit 43. The control unit 43 controls switching between the ON state and the OFF state of the semiconductor switching device 47. Here, the "ON state" means that one end and the other end of the semiconductor switching device 47 are in a conductive state. The "OFF state" means that one end and the other end of the semiconductor switching device 47 are in a non-conducting state.

When the semiconductor switching device 47 is a MOSFET device or an IGBT device, the control unit 43 is connected to a gate terminal of the semiconductor switching device 47. The control unit 43 can turn the semiconductor switching device 47 into an ON state or an OFF state by outputting a predetermined voltage signal to the gate terminal. When a voltage signal is output to the gate terminal to turn the MOSFET device or the IGBT device into the ON state or the OFF state, almost no current flows through the gate terminal. Thus, the MOSFET device or the IGBT device as the semiconductor switching device 47 can reduce the power required to turn the semiconductor switching device 47 into the ON state or the OFF state.

In the shut-off device 4*a*, when the semiconductor switching device 47 is turned OFF, the anode-side terminal of the group 6B and the group 6C are cut off. Even if the semiconductor switching device 47 is turned OFF, however, the power supply unit 41 is not cut off from the group 6B. That is, in a case where the semiconductor switching device 47 is in the OFF state, the power generated by the group 6B is supplied to the power supply unit 41 but not to the inverter 3.

The control unit 43 turns the semiconductor switching device 47 into an OFF state in a case where the amount of power generated by the group 6B is smaller than a predetermined threshold. Thus, when the amount of power generated by the group 6B is smaller than the predetermined threshold, the power of the group 6B is supplied only to the shut-off device 4*a* (the power supply unit 41). With this configuration, when the amount of power generated by the group 6B is small, the power from the group 6B can be used only to drive the open-close units 44*a* and 44*b*. When the power from the group 6B is supplied only to the open-close units 44*a* and 44*b*, even if the amount of power generated by the group 6B is small or unstable, the open-close units 44*a* and 44*b* can be maintained in the closed state (ON state). As a result, the solar power generation system 1 operates stably. The above threshold can be set, for example, as the amount of power with which the open-close units 44*a* and 44*b* operate stably even if the power of the group 6B is supplied to both of the power supply unit 41 and the inverter 3.

Since the shut-off device 4*a* includes the semiconductor switching device 47, the open-close units 44*a* and 44*b* are maintained in the closed state (ON state) even if there occurs an abnormality in the amount of power generated by the group 6B. Thus, the open-close units 44*a* and 44*b* are less likely to open and close while a high voltage is applied to the open-close units 44*a* and 44*b*. As such, the open-close units 44*a* and 44*b* are not required to have a large voltage-handling capacity and can be inexpensive.

The bypass device 48 is connected in parallel to the group 6B. Specifically, the bypass device 48 is connected at one end between the cathode-side terminal of group 6B and the second open-close unit 44*b*. The other end of the bypass device 48 is connected between the first open-close unit 44*a* and the semiconductor switching device 47. The bypass device 48 is, for example, a diode having an anode connected to the cathode side of group 6B and a cathode connected between the first open-close unit 44*a* and the semiconductor switching device 47.

When the solar cell modules of the group 6B are shaded at sunrise or sunset, sometimes sufficient power cannot be output from the group 6B due to an abnormality such as a sudden power drop or abnormal heat generation in the group 6B. At that time, the bypass device 48 forms an electric path that "bypasses" the group 6B and transfers the power generated by the other solar cell module groups. Specifically, in a case where the amount of power generated by the group 6B is insufficient, the semiconductor switching device 47 is turned OFF, and the open-close units 44*a* and 44*b* enter the closed state, the bypass device 48 forms a path through which the power generated by the other solar cell module groups is transferred to the inverter 3.

When the group 6B cannot output sufficient power, the bypass device 48 is able to immediately form an electric path that bypasses the group 6B in which an abnormality has occurred, based on its own electrical characteristics without any command of an external signal.

Note that, the connection of the two terminals of the bypass device 48 can be positioned as desired, as long as the group 6B where the shut-off device 4*a* is connected is bypassed and also at least one of the terminals of the bypass device 48 is connected to the group 6B without connection to the first open-close unit 44*a* or the second open-close unit 44*b*. For example, the anode of the bypass device 48 may be connected to the electric path connecting the anode-side terminal of the group 6A and the second open-close unit 44*b*, and the cathode of the bypass device 48 may be connected to the electric path connecting the anode-side terminal of the group 6B and the first open-close unit 44*a*.

The shut-off device 4*b* has the same configuration as the shut-off device 4*a* except that the connected electric path is different from the shut-off device 4*a*. The shut-off device 4*b* is connected to an electric path 8*c* connecting the group 6C and the group 6D and an electric path 8*d* connecting the group 6D and the group 6E. The shut-off device 4*b* cuts off the connection between the group 6C and the group 6D and the connection between the group 6C and the group 6E in response to the control signal from the inverter 3.

The shut-off device 4*b* is driven by the electric power generated by the solar cell modules 6 of the group 6D. The shut-off device 4*b* is externally attached, for example, to the solar cell modules 6 of the group 6D.

Figure 4:
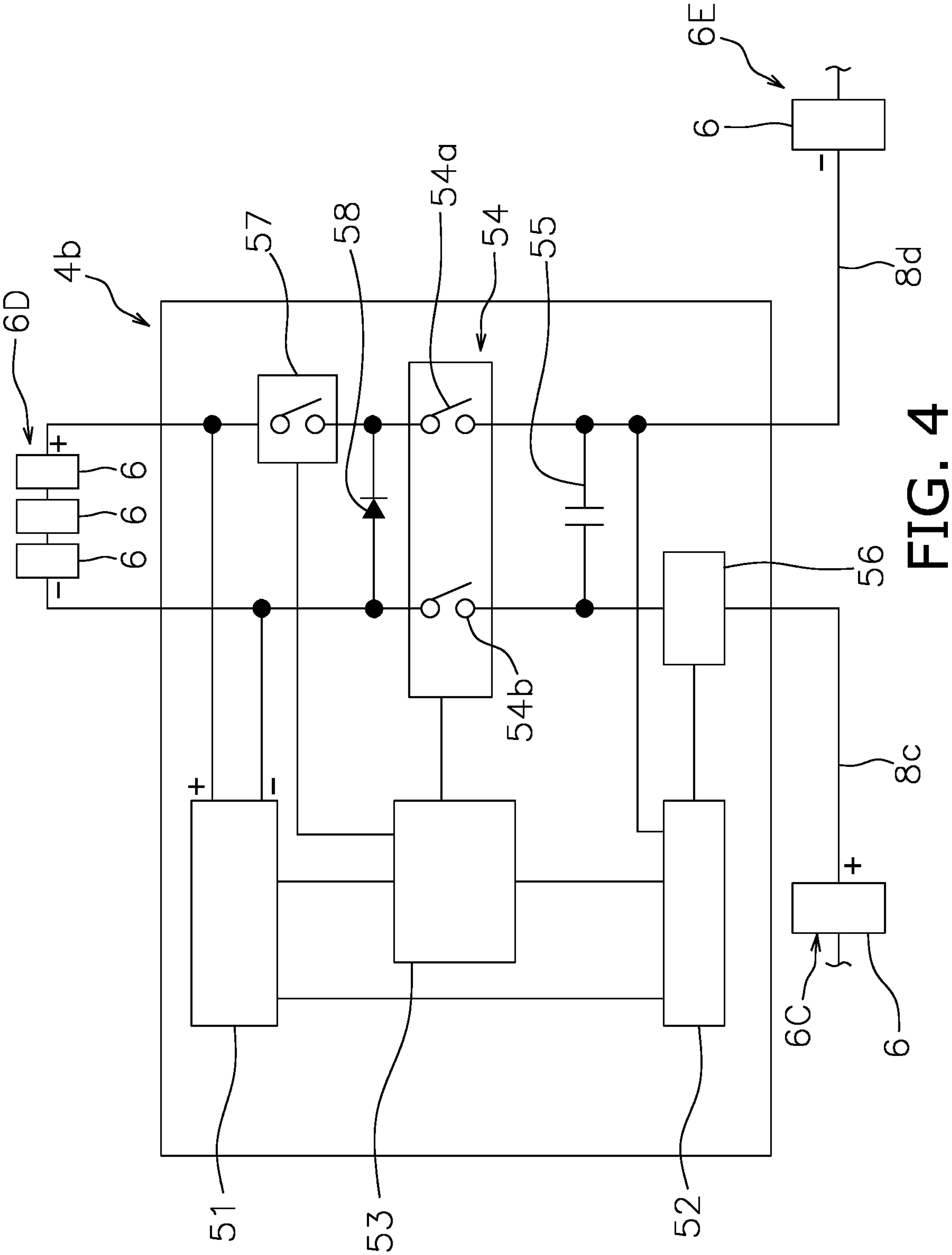
FIG. 4 is a block diagram schematically showing a configuration of a second shut-off device.

As shown in FIG. 4, the shut-off device 4*b* includes a power supply unit 51, a signal-receiving unit 52, a control unit 53, a relay 54, a bypass circuit 55, a signal detection unit 56, a semiconductor switching device 57, and a bypass device 58. The relay 54 includes a first open-close unit 54*a* (an example of a third open-close unit) and a second open-close unit 54*b* (an example of a fourth open-close unit). Since each configuration of the shut-off device 4*b* is the same as each configuration of the shut-off device 4*a*, it will be briefly described.

The power supply unit 51 uses the power generated by the solar cell modules 6 as a power source to generate drive power to drive the shut-off device 4*b*. Here, only the power generated by the solar cell modules 6 of the group 6D is used to generate the drive power to drive the shut-off device 4*b*.

The signal-receiving unit 52 receives the control signal from the control unit 3*c* of the inverter 3 and outputs the received control signal to the control unit 53.

The control unit 53 controls the opening and closing of the contacts of the relay 54. The first open-close unit 54*a* of the relay 54 is connected to the anode-side terminal of the group 6D. The first open-close unit 54*a* is disposed in the electric path 8*d* and opens and closes the connection between the group 6D and the group 6E. The second open-close unit 54*b* is connected to the cathode-side terminal of the group 6D. The second open-close unit 54*b* is disposed in the electric path 8*c* and opens and closes the connection between the group 6C and the group 6D.

The semiconductor switching device 57 is connected in series with the first open-close unit 54*a* in the electric path 8*d*. The semiconductor switching device 57 is, for example, a MOSFET device or an IGBT device.

The control unit 53 turns the semiconductor switching device 57 into an OFF state in a case where the amount of power generated by the group 6D is smaller than a predetermined threshold. The above threshold can be set, for example, as the amount of power with which the first open-close unit 54*a* and second open-close unit 54*b* operate stably even if the power of the group 6D is supplied to both of the power supply unit 51 and the inverter 3.

The bypass device 58 is connected in parallel to the group 6D. The bypass device 48 is connected at one end between the cathode-side terminal of group 6D and the second open-close unit 54*b*. The other end of the bypass device 58 is connected between the first open-close unit 54*a* and the semiconductor switching device 57. The bypass device 58 is, for example, a diode having an anode connected to the cathode side of group 6D and a cathode connected between the first open-close unit 54*a* and the semiconductor switching device 57.

The shut-off device 4*c* has the same configuration as the shut-off device 4*a* except that the connected electric path is different from the shut-off device 4*a* and shut-off device 4*b*. That is, the shut-off device 4*c* includes a power supply unit, a signal-receiving unit, a control unit, a relay 64 including a first open-close unit 64*a* and a second open-close unit 64*b*, a bypass circuit, a signal detection unit, a semiconductor switching device, and a bypass device. Since each configuration of the shut-off device 4*c* is the same as each configuration of the shut-off device 4*a*, the description thereof will be omitted.

The shut-off device 4*c* is connected to an electric path 8*e* connecting the group 6E and the group 6F and an electric path 8*f* connecting the group 6F and the inverter 3. The shut-off device 4*c* cuts off the connection between the group 6E and the group 6F and the connection between the group 6F and the inverter 3 in response to the control signal from the inverter 3.

Figure 5:
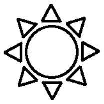
FIG. 5 is a diagram illustrating an example of the operation modes of a shut-off device.
Figure 5:
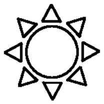
Figure 5:
Figure 5:
Figure 5:
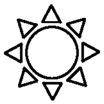

Next, the operation modes of the plurality of shut-off devices 4 will be described with reference to FIG. 5, mainly by taking the operation of the shut-off device 4*a* as an example. The operation modes of the plurality of shut-off devices 4 includes three operation modes of a start mode, an active mode, and a safety mode. The safety mode includes a normal shut-off mode and an emergency safety shut-off mode. Thus, the plurality of shut-off devices 4 operate in four operation modes: a start mode, an active mode, a normal shut-off mode, and an emergency safety shut-off mode.

The start mode is a mode for when sunlight starts to hit the solar cell modules 6. At this time, the solar cell modules 6 receive sunlight and generate power. Then, the shut-off device 4*a* is driven by the drive power generated by the power supply unit 41 using the power generated by the solar cell modules 6. When the shut-off device 4*a* is driven and the control unit 43 receives the control signal from the control unit 3*c* of the inverter 3 via the signal-receiving unit 42, the control unit 43 closes the open-close units 44*a* and 44*b* of the relay 44.

Similarly, the shut-off device 4*b* is driven by the drive power generated by the power supply unit 51 of the shut-off device 4*b* using the power generated by the solar cell modules 6. When the shut-off device 4*b* is driven and the control unit 53 receives the control signal from the control unit 3*c* of the inverter 3 via the signal-receiving unit 52, the control unit 53 turns the first open-close unit 54*a* and the second open-close unit 54*b* of the relay 54 into a closed state. The shut-off device 4*c* operates in the same manner as the shut-off device 4*a*. Consequently, the groups 6A to 6F are connected to the string 2 via the plurality of shut-off devices 4 (shut-off devices 4*a* to 4*c*), and the power generated by the solar cell modules 6 is output to the inverter 3.

In the start mode (particularly at sunrise), the amount of power generated by the solar cell module groups is small. Thus, in the start mode, for example, if the power from the solar cell modules 6 of the group 6B is used to drive the open-close units 44*a* and 44*b* and also to be supplied to the inverter 3, it might happen that sufficient power is not provided to drive the open-close units 44*a* and 44*b*, and thereby even if the open-close units 44*a* and 44*b* attempt to shift from the open state (OFF state) to the closed state (ON state), they immediately return to the open state (OFF state), and this attempt-and-return action may be repeated.

Thus, in the start mode, when the amount of power generated by the group 6B is smaller than a predetermined threshold, the control unit 43 turns the semiconductor switching device 47 into an OFF state. With this configuration, the power from the group 6B is used only to drive the open-close units 44*a* and 44*b*, and thereby the open-close units 44*a* and 44*b* can be maintained in the closed state (ON state) even if the amount of power generated by the group 6B is small.

After that, when the amount of power generated by the group 6B exceeds the predetermined threshold, the control unit 43 turns the semiconductor switching device 47 into an ON state. With this configuration, after the amount of power generated by the group 6B increases sufficiently, it becomes possible to use the power generated by the group 6B to drive the open-close units 44*a* and 44*b* and to supply the inverter 3.

The active mode is a state in which the solar cell modules 6 receive sunlight during the daytime to generate power, and it is substantially the same as the start mode. Thus, in the active mode, the groups 6A to 6F are in connection with each other via the plurality of shut-off devices 4 (shut-off device 4*a* to 4*c*), and the power generated by the solar cell modules 6 is output to the inverter 3.

In the active mode, when the amount of power generated by the group 6B is smaller than a predetermined threshold due, for example, to the influence of the weather or an abnormality of the solar cell module, the control unit 43 turns the semiconductor switching device 47 into an OFF state. As a result, the electric power from the group 6B can be used only to drive the open-close units 44*a* and 44*b* so that the open-close units 44*a* and 44*b* can be maintained in the closed state (ON state) even if the amount of power generated by the group 6B is small.

In the start mode and the active mode, when the amount of power generated by the group 6D is smaller than a predetermined threshold, the control unit 53 of the shut-off device 4*b* turns the semiconductor switching device 57 into an OFF state. Similarly, when the amount of power generated by the group 6F is smaller than a predetermined threshold, the control unit of the shut-off device 4*c* turns the semiconductor switching device 67 into an OFF state.

The normal shut-off mode is a mode when the solar cell modules 6 are not exposed to sunlight at night or due to the influence of bad weather such as rain or a mode when the power generation of the solar cell modules 6 is unstable. In the normal shut-off mode, when there is no power from the solar cell modules 6 in the normal shutdown mode, no control signal is output from the control unit 3*c* of the inverter 3, and the first open-close unit and the second open-close unit of the shut-off devices 4*a* to 4*c* are all in the open state.

In the normal shut-off mode, when the power generation by the solar cell modules 6 is unstable due to the unstable weather or the like, the control signal is output from the control unit 3*c* of the inverter 3. For example, when the amount of power generated by the group 6B is unstable and does not become smaller than the predetermined threshold, the open-close units 44*a* and 44*b* of the relay 44 are turned into the ON/OFF state depending on the power supplied from the solar cell modules 6 of the group 6B.

The emergency safety shut-off mode is a mode in which the electric paths 8*a* to 8*f* are cut off so that the power supply from the solar cell modules 6 to the inverter 3 is stopped during the start mode or the active mode. In the present embodiment, as shown in FIG. 1, when an operation switch 35 is connected to the inverter 3 and the operation switch 35 is operated during the start mode or the active mode of the plurality of shut-off devices 4, the operation mode of the plurality of shut-off devices 4 is switched to the emergency safety shut-off mode.

Specifically, when the operation switch 35 is operated, the control unit 3*c* stops the output of the control signal. When the signal detection unit 46 detects the stop of the control signal of a fixed cycle, the open-close units 44*a* and 44*b* of the relay 44 are turned open via the signal-receiving unit 42 and the control unit 43. At this point in time, the control unit 43 turns the semiconductor switching device 47 into an OFF state, and then turns the open-close units 44*a* and 44*b* of the relay 44 into the open state. As a result, the connection between the group 6A and the group 6B and the connection between the group 6B and the group 6C are cut off, and the output of power from the solar cell modules 6 to the inverter 3 is stopped.

Similarly, when the shut-off device 4*b* detects the stop of the control signal of a fixed cycle, the shut-off device 4*b* controls the open-close units 54*a* and 54*b* of the relay 54 in the open state. As a result, the connection between the group 6C and the group 6D and the connection between the group 6D and the group 6E are cut off. Similarly, when the shut-off device 4*c* detects the stop of the control signal of a fixed cycle, the shut-off device 4*b* controls the open-close units 64*a* and 64*b* of the relay 64 in the open state. As a result, the connection between the group 6C and the group 6D and the connection between the group 6D and the group 6E are cut off. As a result, all the groups 6A to 6F are separated from each other, so that the open-circuit voltage of the string 2 is divided into 165V or less.

In the solar power generation system 1 of the above configuration, since the plurality of solar cell module groups 6A to 6F each have an open-circuit voltage of 165, a highly safe solar power generation system can be provided. Further, the semiconductor switching device 47 is turned into an OFF state when the amount of power generated by the group 6B is smaller than a predetermined threshold. Thus, when the amount of power generated by the group 6B is small, the electric path from the group 6B to the inverter 3 is cut off, and the group 6B can supply power only to the power supply unit 41. That is, when the amount of power generated by the group 6B is small, the power generated by the group 6B is used only to drive the open-close units 44*a* and 44*b*. As a result, the open-close units 44*a* and 44*b* can be maintained in the closed state (ON state) even if the amount of power generated by the group 6B is small or unstable. As a result, the solar power generation system 1 operates stably. The open-close units 54*a* and 54*b* of the shut-off device 4*b* and the open-close units 64*a* and 64*b* of the shut-off device 4*c* can also obtain the same effects as the open-close units 44*a* and 44*b* of the shut-off device 4*a*.

One embodiment of the present invention has been described above, but the present invention is not limited to the above embodiment, and various modifications are possible as long as the modifications are within the scope of the appended claims.

The number of groups of the plurality of solar cell module groups and the number of solar cell modules included in each group are not limited to the above embodiment. The string 2 may be divided into a plurality of solar cell module groups as long as each group has an open-circuit voltage of 165 V or less. Similarly, in the above embodiment, the plurality of shut-off devices 4 include three shut-off devices 4*a* to 4*c*, but the number in the plurality of shut-off devices 4 is not limited to the number used in the described embodiment.

Figure 6:
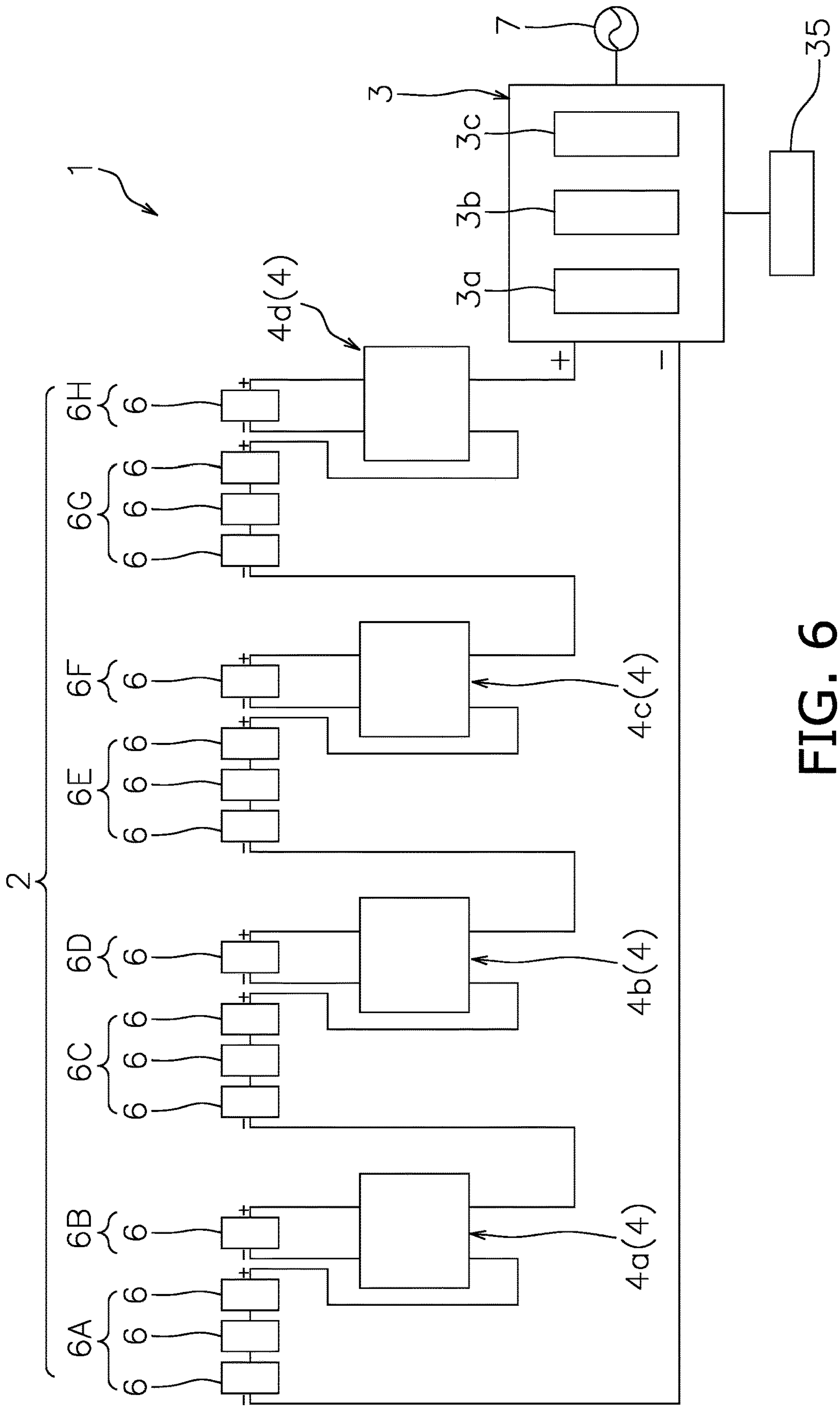
FIG. 6 is a block diagram schematically showing a configuration of a solar power generation system according to another embodiment.

As briefly shown in FIG. 6, the plurality of shut-off devices 4 may be disposed so that the open-circuit voltage of the string 2 is divided into 165V or less in a cut-off state. In FIG. 6, the plurality of shut-off devices 4 include four shut-off devices 4*a* to 4*d*. Further, each of the groups 6A, 6C, 6E, and 6G includes three solar cell modules 6 connected in series with each other, and each of the groups 6B, 6D, 6F, and 6H includes one solar cell module 6. Therefore, the open-circuit voltage of the groups 6A, 6C, 6E, 6G is 150V, and the open-circuit voltage of the groups 6B, 6D, 6F, 6H is 50V. Alternatively, at least one group among the plurality of solar cell module groups may include two solar cell modules 6.

Figure 7:
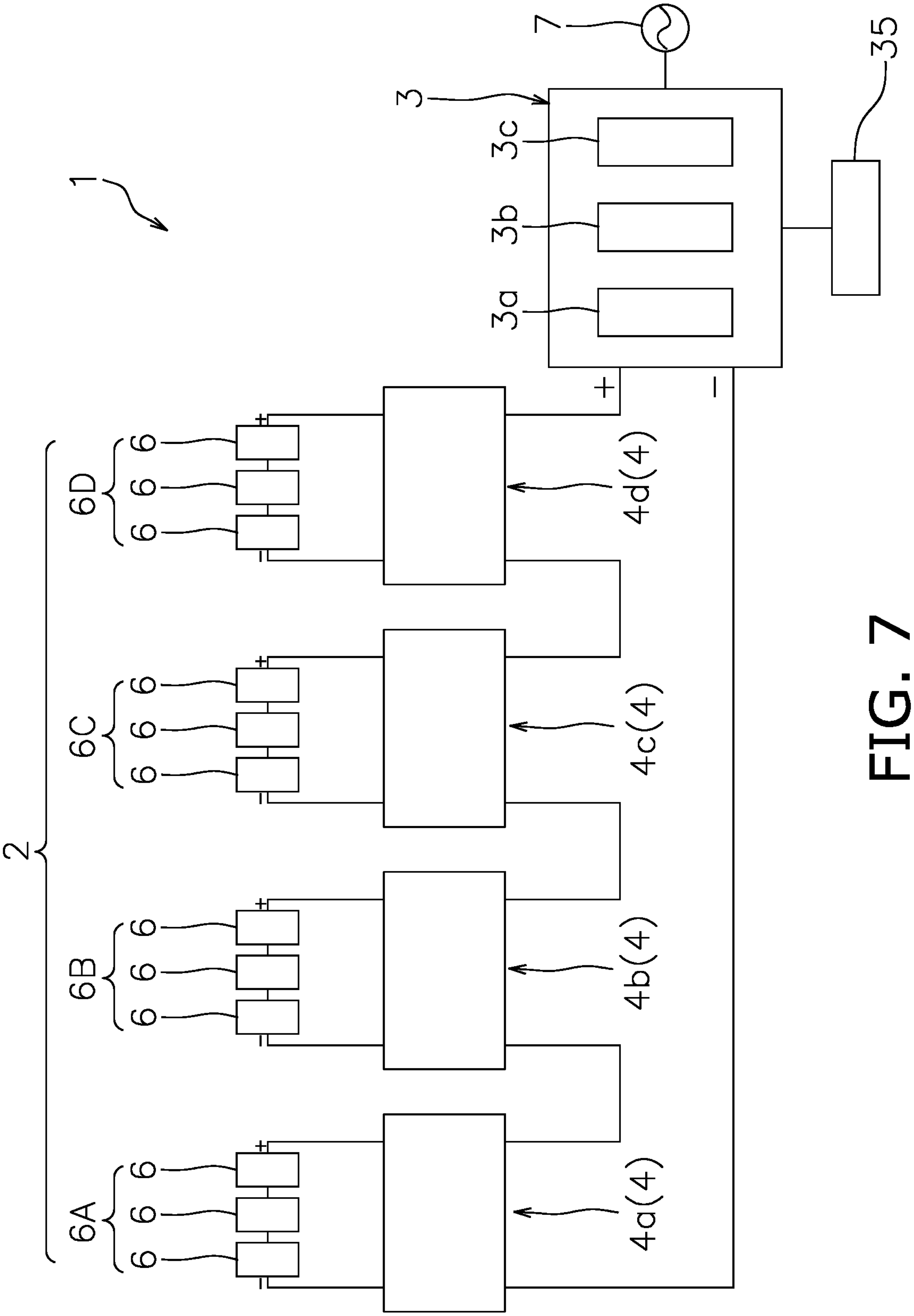
FIG. 7 is a block diagram schematically showing a configuration of a solar power generation system according to another embodiment.

As shown briefly in FIG. 7, the plurality of shut-off devices 4 may be disposed in each of the plurality of solar cell module groups. In this case, it is preferable that each of the plurality of solar cell module groups includes the plurality of solar cell modules 6.

Figure 8:
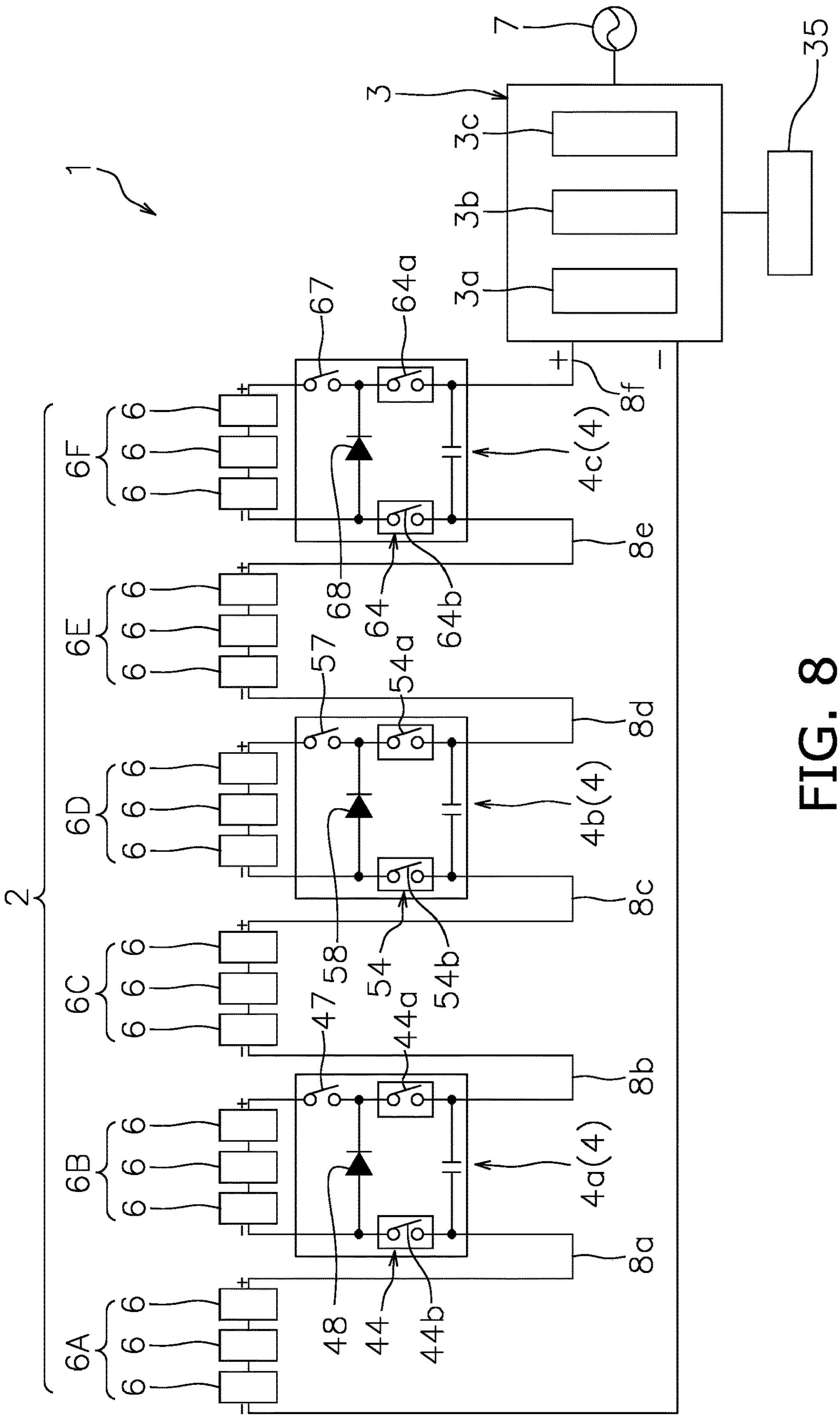
FIG. 8 is a block diagram schematically showing a configuration of a solar power generation system according to another embodiment.

In the embodiment described above, the relay 44 of the shut-off device 4*a* has two contacts of the first open-close unit 44*a* and the second open-close unit 44*b*, but as shown briefly in FIG. 8, the relay 44 may be two relays having a single contact. That is, the shut-off device 4*a* may be configured to independently control the opening and closing of the first open-close unit 44*a* and the second open-close unit 44*b*. Similarly, the shut-off device 4*b* may be configured to be able to independently control the first open-close unit 54*a* and the second open-close unit 54*b*. Similarly, the shut-off device 4*c* may be configured to be able to independently control the first open-close unit 64*a* and the second open-close unit 64*b*.

In the above-described embodiment, the control signal is output to the plurality of shut-off devices 4 by power line communication, but the control signal may be output to the plurality of shut-off devices 4 by wireless communication such as Wi-Fi®. Alternatively, the inverter 3 and the plurality of shut-off devices 4 may be configured to be in communication with each other by wireless communication.

The first control signal may be stopped in modes other than the emergency safety shut-off mode or as a part of the normal shut-off mode (i.e., "NO" in "POWER GENERATION" in FIG. 5), and the output of the control signal may be output in the emergency safety shut-off mode or as a part of the normal shut-off mode. In this case, the plurality of shut-off devices 4 may open the open-close units of the relay when the control signal from the inverter is received and may close the open-close units of the relay while not receiving the control signal.

REFERENCE NUMERALS

- 1 Solar power generation system
- 2 String
- 3 Inverter
- 4 Plurality of shut-off device
- 4*a* Shut-off device (example of first shut-off device)
- 6 Solar cell module
- 41 Power supply unit (example of power supply unit)
- 44*a* First open-close unit
- 44*b* Second open-close unit
- 47 Semiconductor switching device (example of first semiconductor switching device)
- 48 Bypass device (example of power supply unit)

The invention claimed is:

1. A solar power generation system, comprising:

a string including a plurality of solar cell module groups connected in series with each other, the solar cell module groups each including one or more solar cell modules connected in series with each other;

an inverter connected to the string and configured to convert DC power output from the string to AC power; and a plurality of shut-off devices configured to cut off a connection between the plurality of solar cell module groups in response to a control signal from the inverter, the plurality of shut-off devices including a first shut-off device and a second shut-off device;

wherein each of the plurality of solar cell module groups has an open-circuit voltage equal to or less than a predetermined open-circuit voltage, the plurality of solar cell module groups include a first group, a second group connected to the first group, and a third group connected to the second group, the first shut-off device includes a first open-close unit connected to an anode-side terminal of the second group;

a first semiconductor switching device connected in series between the anode-side terminal of the second group and the first open-close unit, and a first power supply unit configured to generate power to drive the first open-close unit, the first power supply unit having 1) an anode-side terminal connected between the anode-side terminal of the second group and the first semiconductor switching device and 2) a cathode-side terminal connected to a cathode-side terminal of the second group, and the first semiconductor switching device is configured to enter an OFF state in a case where an amount of power generated by the second group is smaller than a predetermined threshold.

2. The solar power generation system according to claim 1, wherein the first shut-off device includes a first bypass device, the first bypass device being connected at one end to the cathode-side terminal of the second group and connected at another end between the first open-close unit and the first semiconductor switching device.

3. The solar power generation system according to claim 1, wherein the first semiconductor switching device is a MOSFET device or an IGBT device.

4. The solar power generation system according to claim 1, wherein the first shut-off device includes a second open-close unit connected to the cathode-side terminal of the second group.

5. The solar power generation system according to claim 4, wherein the second open-close unit is driven by the power supplied from the first power supply unit.

6. The solar power generation system according to claim 4, wherein the first shut-off device is configured to control opening and closing of the first open-close unit and the second open-close unit independently of each other.

7. The solar power generation system according to claim 1, wherein at least one of the first group, the second group, and the third group of the plurality of solar cell module groups includes the plurality of solar cell modules connected in series.

8. The solar power generation system according to claim 1, wherein the plurality of solar cell module groups further include a fourth group connected to the third group and a fifth group connected to the fourth group, the second shut-off device includes a third open-close unit connected to an anode-side terminal of the fourth group, a second semiconductor switching device connected in series between the anode-side terminal of the fourth group and the third open-close unit, and a second power supply unit configured to generate power to drive the third open-close unit, the second power supply unit having 1) an anode-side terminal connected between the anode-side terminal of the fourth group and the second semiconductor switching device and 2) a cathode-side terminal connected to a cathode-side terminal of the fourth group, and the second semiconductor switching device is configured to enter an OFF state in a case where an amount of power generated by the fourth group is smaller than a predetermined threshold.

9. The solar power generation system according to claim 8, wherein the second shut-off device includes a second bypass device, the second bypass device being connected at one end to the cathode-side terminal of the fourth group and being connected at another end between the third open-close unit and the second semiconductor switching device.

10. The solar power generation system according to claim 8, wherein the second semiconductor switching device is a MOSFET device or an IGBT device.

11. The solar power generation system according to claim 8, wherein the second shut-off device includes a fourth open-close unit connected to the cathode-side terminal of the fourth group.

12. The solar power generation system according to claim 11, wherein the fourth open-close unit is driven by the power supplied from the second power supply unit.

13. The solar power generation system according to claim 11, wherein the second shut-off device is configured to control opening and closing of the third open-close unit and the fourth open-close unit independently of each other.

14. The solar power generation system according to claim 1, wherein the predetermined open-circuit voltage is 165 V.

15. The solar power generation system according to claim 1, wherein the inverter outputs the control signal to the plurality shut-off devices by power line communication.

16. The solar power generation system according to claim 1, wherein the inverter outputs the control signal to the plurality shut-off devices by wireless communication.

* * * * *